July 13, 1937. J. E. TALBOTT 2,086,927
TRANSMISSION LINE SUPPORT
Filed Feb. 6, 1936
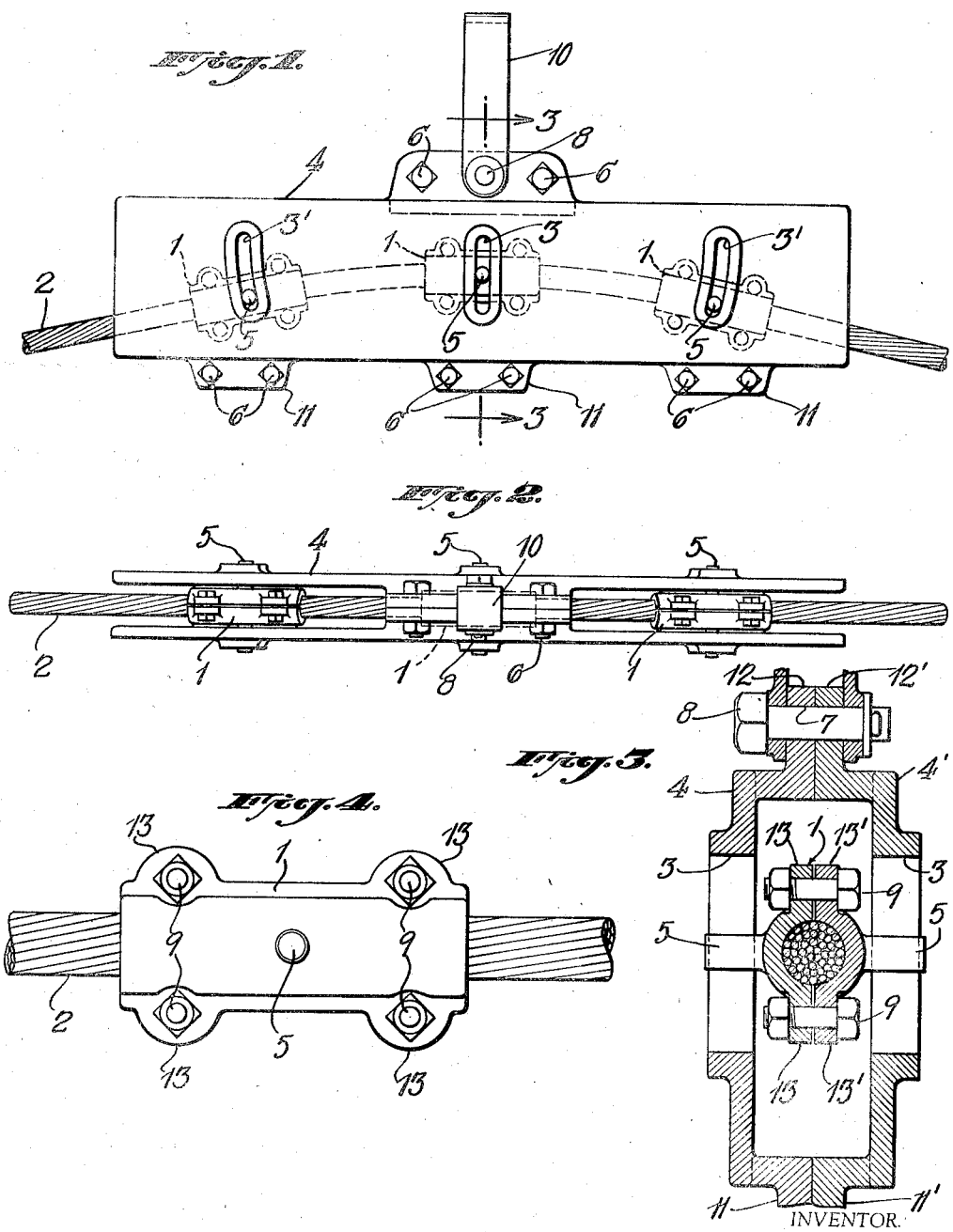
INVENTOR.
JAMES E. TALBOTT.
BY
ATTORNEYS Patented July 13, 1937

2,086,927

UNITED STATES PATENT OFFICE 2,086,927

TRANSMISSION LINE SUPPORT

James E. Talbott, Dobbs Ferry, N. Y., assignor to Anaconda Wire & Cable Company, New York, N. Y., a corporation of Delaware Application February 6, 1936, Serial No. 62,596

2 Claims. (Cl. 248—63)

This invention relates to an improved device for the support of cables designed to operate at high potentials. In general such conductors are formed from a multiplicity of strands to give the maximum degree of flexibility and an attempt is also made to dispose most of the metal around the circumference of the cross-section to minimize the so-called skin effect. The usual cable designed for this type of service is therefore composed of a number of relatively fine strands, has the minimum amount of metal at the core, and must be carried by carefully designed supports.

The chief object of this invention is to provide a cable support which will minimize the stresses within the cable, tend to dampen vibration in the conductor, and prevent the cable from "running through" the supports if failure should occur. This is accomplished by restraining the cable laterally within the supporting device at a plurality of points and yet allowing for independent vertical motion of the cable at the points of support within the hanger.

These objects of the present invention together with further objects and advantages will be more apparent from the following detailed description when read in conjunction with the accompanying drawing.

Fig. 1 is an elevation of a hanger made in accordance with this invention; Fig. 2 is a plan view of the same hanger; Fig. 3 is a detail view of a clamp designed for use in conjunction with this hanger; and Fig. 4 is a cross-section of the clamp shown in Fig. 3.

Referring to the drawing, the present invention comprises a hollow rectangular and open ended hanger frame 4 through which the cable 2 extends, and a plurality of trunnion clamp means 1 adapted to be attached to the said cable 2 at spaced intervals along the length enclosed within said frame 4, the said clamps 1 each being provided with opposite pin extensions 5 and the vertical side walls of the hanger frame 4 being each provided with aligned openings 3, 3', 3' adapted to receive the said extensions 5, the said openings having a width approximating the diameter of said pin extensions 5 and a length several times the diameter of the said pin extensions, one of said aligned openings 3 being disposed at approximately the longitudinal center of said side walls of frame 4 with its length lying substantially vertically and the other two aligned openings 3', 3' being disposed equidistant from the said center openings 3 with their lengths lying in an arcuate vertical plane from the center of the said opening 3.

With this arrangement the length of cable 2 enclosed within the hanger frame 4 assumes a natural arcuate bend substantially as indicated, the center trunnion pins 5 being free to move vertically within aligned openings 3, to substantially the position indicated, and the trunnion pins 5 on the two outer trunnions 1 taking the positions in openings 3', 3' respectively substantially as indicated. Pins 5 on each trunnion 1 being of substantially the same diameter as the width of openings 3, 3', 3' are restrained laterally or from horizontal movement along the cable axis thereby securely anchoring cable 2 within the frame 4. However, as the pins 5 are free to move vertically within each opening 3, 3', 3' and are also free to move a slight distance horizontally in a direction normal to the longitudinal axis of the cable, as well as to rotate to a slight extent about the cable axis, vibration of the cable within the anchoring means may occur without deleterious straining of the cable about any particular point. Therefore failure of the cable at the point of anchorage or suspension within frame 4 through fatigue hardening is substantially eliminated.

Hanger frame 4 may be comprised of a single piece hollow and open ended rectangular body of metal as by casting or pressing, or may be comprised as indicated in the drawing of two separate and similar halves adapted to be assembled together into a hollow and open ended rectangular frame.

This latter structure appears preferable in view of the difficulty of attaching trunnions 1 to the cable and thereafter enclosing the length of cable and the attached trunnions within the frame 4. In view of this difficulty I prefer to comprise frame 4 of two substantially identical troughs 4—4', with means such as extensions 11, 11' and 12, 12' to mechanically unite the same together as by bolts 6 to form the desired hollow and open ended rectangular frame 4. Extensions 12, 12' are additionally provided with a substantially central opening 7 through which extends bolt 8 operatively attaching strap 10 to the frame 4.

The trunnions 1 may be of several forms. The structure indicated in the drawing, however, appears to be the most practical. The trunnions preferably comprise two substantially identical halves each having an arcuate recess adapted to engage the peripheral surface of cable 2 and each having cooperating extensions 13, 13' adapted as by bolts 9 to bring the two halves together in frictional engagement with the peripheral surface of the cable 2.

The extensions 5 on each of said trunnion halves are preferably formed integrally therewith but it would not be a departure from the present invention to form the same separately and thereafter attach the said extensions as by a threaded or other joint to the said trunnion clamp 1.

Having broadly and specifically described the present invention and given one specific embodiment of the same it is apparent that many modifications and adaptations of the same may be made without departing from the nature and scope thereof as may fall within the scope of the following claims:

What I claim is:

1. A cable support comprising in combination a hanger frame adapted to enclose a length of cable and provided with means to sustain said frame from an overhead support, the opposite vertically supported side walls of said frame being provided with three sets of aligned openings, one pair of said openings being in substantially the axial center of the frame and extending vertically above the said center a distance several times the width of the said opening, and two pairs of said openings being disposed equidistantly on opposite sides of said first pair and disposed a similar vertical height above and below the longitudinal center as said first pair but arcuately about the said center axis, clamp means adapted to be attached to the said length of cable enclosed by said frame and opposite extension members on said clamps adapted to engage in said aligned openings, the engaging parts thereof being of a width approximating the diameter of said openings and a height adapted to permit relatively free movement of the same vertically in said openings.

2. A cable support means comprising a hollow rectangular and open ended hanger frame adapted to enclose a length of cable, means to suspend said frame from an overhead support and a plurality of trunnion clamps adapted to be attached to the said cable at spaced intervals along the length enclosed within said hanger and to frictionally engage the periphery of the said cable, said clamps each being provided with opposite pin extensions and the vertical side walls of the hanger frame being each provided with aligned openings adapted to receive the said extensions, the said openings having a width approximately the diameter of said extensions and a length several times the diameter of the said extensions, one of said aligned openings being disposed at approximately the longitudinal center of the said side walls with its length lying substantially normal to the length of said walls and the two other openings being disposed on either side of and equidistant from the said center opening with their respective lengths arcuately disposed about a center axis approximating the center of the said first opening.

JAMES E. TALBOTT.